(12) United States Patent
Sassa

(10) Patent No.: US 7,573,502 B2
(45) Date of Patent: Aug. 11, 2009

(54) CAMERA APPARATUS

(75) Inventor: Atsushi Sassa, Higashimurayama (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 374 days.

(21) Appl. No.: 11/655,965

(22) Filed: Jan. 22, 2007

(65) Prior Publication Data

US 2007/0182827 A1 Aug. 9, 2007

(30) Foreign Application Priority Data

Jan. 24, 2006 (JP) .............................. 2006-014694

(51) Int. Cl.
*H04N 5/225* (2006.01)
*H04N 5/232* (2006.01)

(52) U.S. Cl. ................. 348/211.2; 348/373; 348/211.1; 348/211.4

(58) Field of Classification Search ................................ 348/211.99–211.14
See application file for complete search history.

(56) References Cited

U.S. PATENT DOCUMENTS 5,022,383 A * 6/1991 Sakiyama et al. ........... 600/109
5,243,989 A * 9/1993 Saiga et al. .................. 600/443
7,161,622 B1 * 1/2007 Oinoue ..................... 348/211.1
2005/0185087 A1 * 8/2005 Chiu et al. .................. 348/373
2005/0279914 A1 * 12/2005 Dimsdale et al. ............ 250/205

FOREIGN PATENT DOCUMENTS

| JP | 8205136 | 8/1996 |
| JP | 8307740 | 11/1996 |
| JP | 9-284612 | 10/1997 |

* cited by examiner

*Primary Examiner*—David L Ometz
*Assistant Examiner*—Pritham Prabhakher
(74) *Attorney, Agent, or Firm*—Brundidge & Stanger, P.C.

(57) ABSTRACT

High-resolution image data and large-capacity data are transmitted as transmission data. A camera apparatus includes a fixing part and a moving part rotating about a rotary axis. The fixing part includes at least a first wireless section, a first signal processing section, and a power source section. The moving part includes at least a camera section, a second signal processing section, a second wireless section, and a driver section for driving the camera section. The first wireless section is coupled with the second wireless section using a waveguide tube to propagate an electric wave. The waveguide tube includes a waveguide path aligned with a center of the rotary axis of the moving part.

5 Claims, 4 Drawing Sheets

CAMERA APPARATUS

INCORPORATION BY REFERENCE

The present application claims priority from Japanese application JP 2006-014694 filed Jan. 24, 2006, the content of which is hereby incorporated by reference into this application.

BACKGROUND OF THE INVENTION

The present invention relates to a camera apparatus, and in particular, to an endless camera apparatus using wireless data transmission.

Monitor camera apparatuses using imaging devices have been actually employed in many cases to monitor an invader or an invading object (which will be referred to as an invading object hereinbelow) making an invasion upon, for example, a public building, a public place, a hospital, a bank, a shop such as a supermarket, or a zone which any unauthorized person is forbidden to enter such as a dam, a base, or an airport. When such monitor camera apparatus is employed to a remote monitor system, the monitor area to be monitored by the system can be easily confirmed by visually checking images produced by the monitor camera apparatus. It is therefore possible to construct a high-quality warning monitor system capable of appropriately and rapidly cope with various states according to situations monitored by the monitor camera apparatus.

However, to monitor the monitor target area for a long period of time by remote control, high reliability is required for such monitor camera system. Particularly, when the monitoring apparatus is installed in a place requiring high security such as a bank, a base, or an airport or a place at a high altitude or a remote place such as a dam or a port, maintenance of the apparatus is quite troublesome. There consequently exists a demand for a monitor camera apparatus in which the human power and time required for the maintenance and inspection thereof can be reduced to the maximum extent.

To fully achieve the monitoring function, the monitor camera apparatus requires a wide monitor zone depending on places. For this purpose, the monitor camera apparatus includes a driver module to drive the camera itself in a pan direction (horizontal direction) and in a tilt direction (direction of angle of elevation) to widely change the visual field range of the monitor camera apparatus. Particularly, there recently exists a demand for a camera apparatus which covers a wide monitor range to track an invading object by use of an endless rotation in a pan direction.

On the other hand, the camera apparatus generally includes a coaxial cable to transmit a video signal from a camera section to shoot an object as well as a camera control signal and to supply power for the operation of the camera section. The coaxial cable is connected to a fixing part and a moving part in the configuration. That is, a first end of the coaxial cable is connected to the fixing part and a second end thereof is connected to the moving part. For example, the camera section and the lightening device are configured to be united with each other onto a rotary axis which rotates together with the camera section so that the camera section and the lightening device move as one unit. However, the wiring cables of the camera section, the lightening device, and the like are disposed on the substrate of the fixing part which does not rotate together with the camera section. Therefore, in the monitor camera apparatus in which the visual field is to be frequently changed as described above, the wiring cables are twisted and are repeatedly expanded and contracted. This causes disconnection or connection failure of the wiring cables. In the camera apparatus connected by wiring cables as above, it is not possible to conduct the endless rotation in the pan direction.

Such camera apparatus to implement the endless rotation has already been put to practical uses. FIG. 5 is a diagram showing an outline of the configuration of a camera apparatus of a conventional type using slip rings. The camera apparatus of FIG. 5 includes a moving part 501 and a fixing part 502. The moving part 501 includes a camera section 503 to shoot an image of an object such as an invader or an invading object, a signal processing section 504 which appropriately processes the video signal of the image of the object shot by the camera section 503 and which converts the video signal into a signal for transmission, a camera driver section 505 to drive the camera section 503 in the pan and tilt directions, a power source section 506 to supply power to the camera section 503, the signal processing section 504, and the driver section 505 and so on. The moving section 501 can conduct endless rotation about a rotary axis, not shown.

The fixing part 502 includes a signal processing section 508 to appropriately process the video signal from the signal processing section 504, an interface (I/F) section 510, a power source section 509 and so on. The fixing part 502 is attached to a place at a high altitude, for example, on a wall or a ceiling. Reference numeral 507 indicates slip rings S1, S2, and S3 each of which includes as well known a fixed conductor and a rotating conductor or a rotating (or a rotary brush), not shown. Reference numeral 511 is an input/output terminal for the video and control signals and reference numeral 512 is a power input terminal.

Operation of the configuration will be briefly described. Alternating-current (ac) power inputted from the power terminal 512 is converted by the power source section 509 into, for example, direct-current (dc) power to be supplied via the slip ring S3 to the power source section 506. Although not shown in FIG. 5, it is to be appreciated that power is supplied from the power source section 506 respectively to the camera section 503, the signal processing section 504, the driver section 505 and so on. Control signals for the camera section 503 and the driver section 505 are inputted from the input terminal 511 to be fed via the interface section 510 to the signal processing section 508. The control signals are separated in the signal processing section 508 and are applied via the slip ring S2 respectively to the camera section 503 and the driver section 505. The control signals are used, for example, to adjust the focus and the color balance in the optical system of the camera section 503 and to adjust the pan and tilt angles in the driver section 505. The video signal of the image of the object shot by the camera section 503 is appropriately processed by the signal processing section 504 to be supplied via the slip ring S1 to the signal processing section 508 and is then outputted via the interface section 510 from the input/output terminal 511.

As described above, in the camera apparatus employing slip rings, the moving part 501 including the camera section 503 can conduct endless rotation. It is therefore possible to configure a camera apparatus which covers a wide range as a monitor device. However, as can be seen from FIG. 5, when the video data and the control data from the camera section are supplied via the slip rings, the transmission data is limited to analog data of low resolution or control data with a small amount of information. For example, to transmit image data of high resolution and data of a large capacity, it is required to use digital signals in a range from about several megahertz (MHz) to about 30 MHz. This consequently leads to a problem that the digital signals of such high frequency cannot be transmitted via the slip rings. There hence exists a demand for the implementation of a camera apparatus which can conduct the endless rotation and which can transmit image data of high resolution and data of a large capacity.

The technique described above are described in, for example, JP-A-9-284612.

SUMMARY OF THE INVENTION

According to the conventional method using slip rings, only analog data of low resolution or control data including a small amount of information can be transmitted, namely, it is not possible to transmit image data of high resolution and large-capacity data.

It is therefore an object of the present invention to provide a camera apparatus enabling transmission of high-resolution and high-quality image data and the like.

Another object of the present invention is to provide a camera apparatus capable of conducting the endless rotation and capable of transmitting digital data and the like.

Still another object of the present invention is to provide a camera apparatus employing wireless transmission.

In accordance with the present invention, a camera apparatus is configured to include a fixing part and a moving part which rotates about a rotary axis. The fixing part includes at least a first wireless section, a first signal processing section, and a power source section. The moving part includes at least a camera section, a second signal processing section, a second wireless section, and a driver section for driving the camera section. The camera apparatus further includes a waveguide tube which propagates an electric wave and which couples the first wireless section with the second wireless section. The waveguide tube includes a waveguide path aligned with a center of the rotary axis of the moving part.

The camera apparatus is configured that either one of the first and second wireless sections is fixed onto a first end of the waveguide tube and other one of the first and second wireless sections is supported with a predetermined gap between the other one wireless section and a second end of the waveguide tube.

The camera apparatus is configured to further includes a shielding cylinder for preventing leakage of the electric wave. The shielding cylinder includes an axis thereof aligned with an axis of the waveguide path and covers the gap.

In the camera apparatus, the shielding cylinder has a length set to at most about a quarter of a wavelength λ of the electric wave in the waveguide tube, the electric wave propagating through an inside of the waveguide tube.

The camera apparatus is configured that the fixing part further includes a power source section. The camera apparatus further includes a slip ring on the waveguide tube. Power from the power section is fed via the slip ring to at least to the camera section, the second signal processing section, the second wireless section, the second wireless section, and the driver section for driving the camera section of the moving part. A video signal from the camera section disposed in the moving part is obtained via the second wireless section and the waveguide tube from the first wireless section.

Moreover, the camera apparatus of the present invention further is configured to include a control signal input section such that the control signal is obtained via the first wireless section and the waveguide tube from the second wireless section. The carrier frequency to transmit the control signal via the waveguide tube is different from the carrier frequency to transmit the video signal via the waveguide tube.

According to the present invention described above, by using the camera apparatus capable of conducting the endless rotation, it is possible to construct a high-resolution and high-quality camera apparatus.

Another object of the present invention is to provide a camera apparatus capable of transmitting high-resolution and high-quality image data. Since digital data can be transmitted using the wireless transmission, it is possible to construct a high-resolution and high-quality camera system.

Other objects, features and advantages of the invention will become apparent from the following description of the embodiments of the invention taken in conjunction with the accompanying drawings.

DESCRIPTION OF THE EMBODIMENTS

Figure 1:
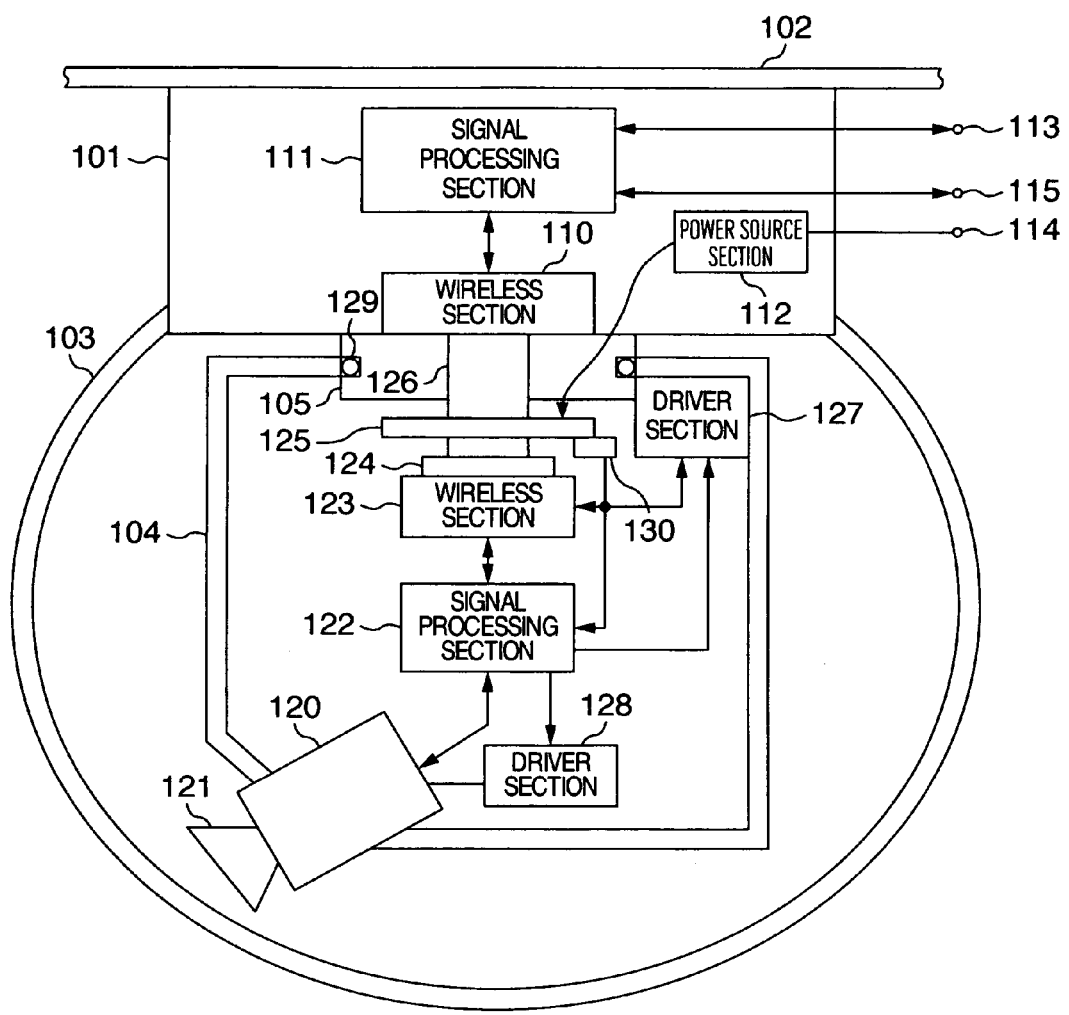
FIG. 1 is a diagram showing an outline of the configuration for explaining an embodiment of the present invention.

Referring to FIG. 1, description will be given of an embodiment of the present invention. FIG. 1 shows an outline of the configuration of the embodiment of the present invention. The configuration of FIG. 1 includes a support section 101 (also called a fixing section) of a monitor camera apparatus and is fixed onto, for example, a ceiling 102. Reference numeral 103 is a protective cover in the contour of a dome formed of transparent or semi-transparent glass or resin and is fixed onto the support section 101.

Reference numeral 104 is a cabinet (also called a moving section) constituting the moving section and is rotably coupled via a coupling shaft 105 with the support section 101. Specifically, in the configuration, the cabinet 104 constituting the moving section is coupled via a bearing 129 with the coupling shaft 105 to conduct the endless rotation by the driver section 127.

The cabinet 104 includes a camera section 120 to produce an image of an invading object, a zoom lens 121 to magnify the image of the object, a signal processing section 122 which appropriately processes the video signal produced by the camera section 120 and which transmits the processed signal therefrom, a wireless section 123 to transmit through wireless transmission the video signal using a carrier of, for example, a millimeter band; a shielding cylinder 124 to prevent leakage of electric waves, a driver section 128 to drive the camera section 120, and a slip ring rotary conductor (or a rotary brush) 130. These constituent components arranged in the cabinet 104 are fixed onto the cabinet according to necessity and rotate together with the cabinet 104 about an axis 200 (shown in FIGS. 2A and 2B) of the coupling shaft 105. The constituent components disposed in the cabinet 104 are only representatively shown. That is, other parts and members are also disposed therein according to necessity.

Reference numeral 126 is a circular waveguide tube. The carrier of the millimeter band propagates through the inside of the waveguide tube 126. The waveguide tube 126 is fixed onto the fixing part 101. Reference numeral 125 is a fixed conductor of slip rings and is fixed onto an outer circumference of the waveguide tube 126.

The support section 101 includes a wireless section 110 to receive the carrier signal of the millimeter band propagating through the waveguide tube 126, a signal processing section 111 to appropriately process the signal from the wireless section 110, and a power source section 112. Reference numeral 113 is a video signal input/output terminal, reference numeral 114 is a power input terminal, and reference numeral 115 is a control signal input/output terminal. The support section 101 naturally includes other parts according to necessity.

Description will now be given of operation of the monitor camera apparatus shown in FIG. 1. For example, an ac voltage supplied to the power input terminal 114 is converted into a dc voltage by the power source section 112 and is fed via the fixed conductor 125 of the slip ring and the rotary conductor (or rotary brush) 130 of the slip ring to the camera section 120, the signal processing section 122, the wireless section 123, the driver sections 127 and 128 and so on. In the embodiment, although the power source section 112 converts the ac voltage into a dc voltage, the conversion may be conducted in the cabinet 104. In FIG. 1, only part of the power supply operation is shown. The slip ring is employed for the power supply operation for the following reason. It is possible to supply large power, and the frequency is low for the direct current and the alternating current, and hence the transmission is not hindered.

The video signal produced by the camera section 120 is processed through a predetermined operation by the signal processing section 122 and is fed to the wireless section 123. The wireless section 123 converts the video signal into a carrier signal of the millimeter band, which will be described later, and the signal is transmitted via the waveguide tube 126 to the wireless section 110. The wireless section 110 converts the carrier signal received as above into a baseband signal, which is then delivered to the signal processing section 111. The signal processing section 111 executes predetermined signal processing for the signal from the wireless section 110 to send the signal from the video signal output terminal 113 to a transmission path in the subsequent stage or to display a monitor image on a monitor, not shown.

If a control signal from, for example, a monitor center is inputted to the control signal input/output terminal 115, the control signal is appropriately processed by the signal processing section 111 to be supplied to the wireless section 110. The wireless section 110 converts the control signal into a carrier signal of the millimeter band, which will be described later, and the signal is transmitted via the waveguide tube 126 to the wireless section 123. The wireless section 123 converts the carrier signal received as above into an Intermediate-Frequency (IF) signal and amplifies the signal to deliver the signal to the signal processing section 122. The signal processing section 122 converts the IF signal into a baseband signal and separates the control signal to thereby control the camera section 120 and the zoom lens 121. The control signal is also fed to the driver sections 127 and 128 to adjust the pan and tilt directions.

Figure 2A:
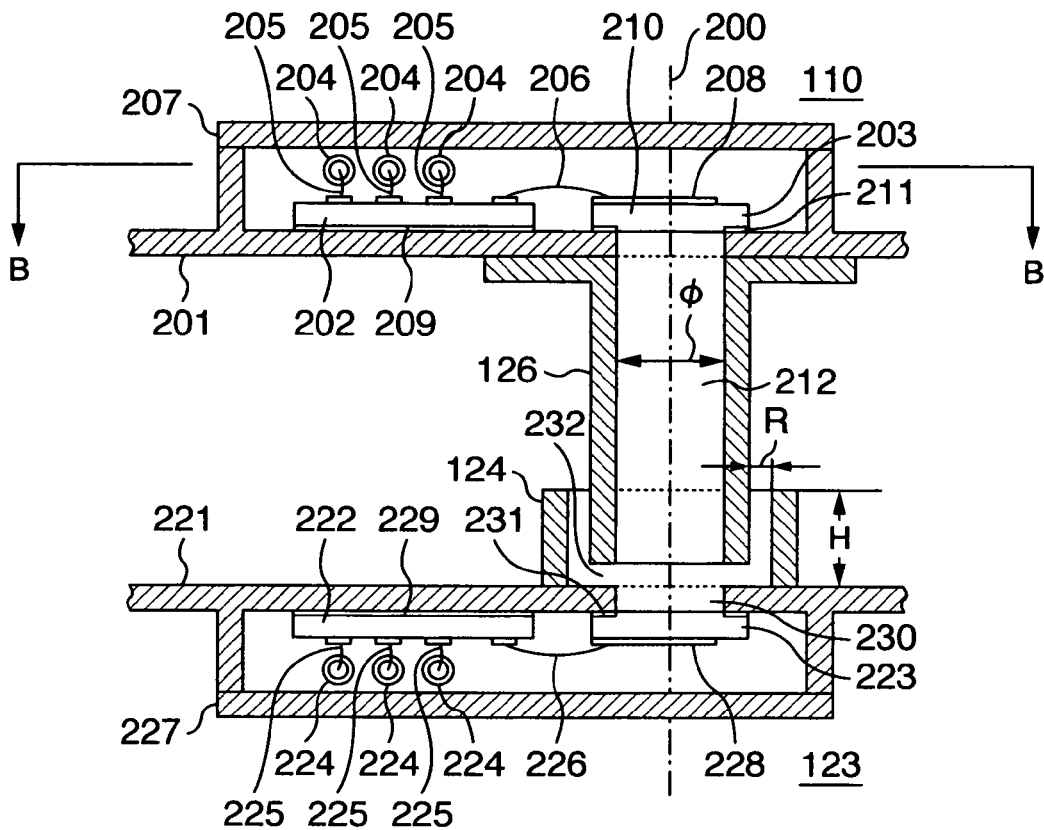
FIG. 2A is a diagram for explaining a concrete configuration of a wireless section of the present invention.
Figure 2B:
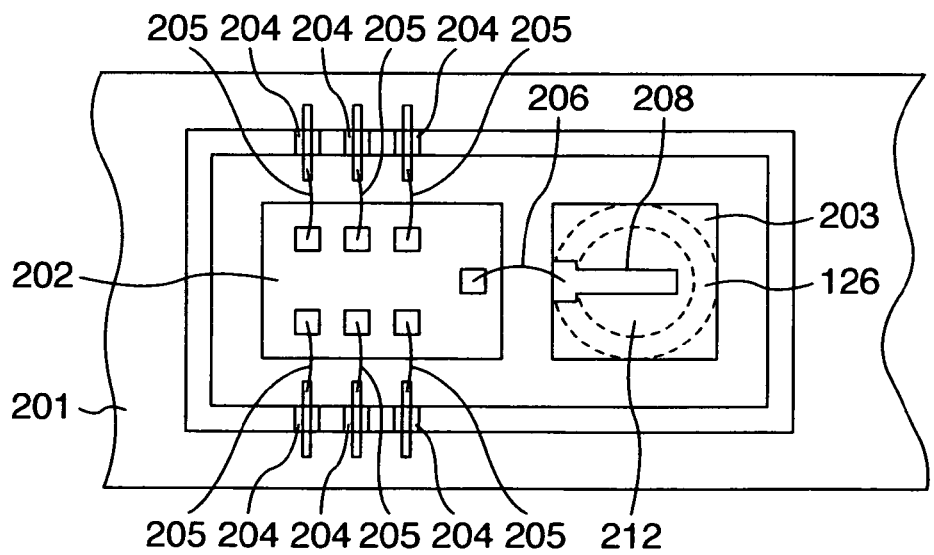
FIG. 2B is a plan view of FIG. 2A taken along line B-B.

Referring now to FIGS. 2A and 2B, description will be given in detail of the wireless sections 110 and 123, the waveguide tube 126, and the shielding cylinder (having a cylindrical contour) 124. FIG. 2A shows a cross-sectional view of the wireless sections 110 and 123, the waveguide tube 126, and the shielding cylinder 124. FIG. 2B is a plan view of FIG. 2A along line B-B. The wireless sections 110 and 123 are only partially shown in FIGS. 2A and 2B. Specifically, only part thereof coupled with the waveguide tube 126 are shown. In FIGS. 2A and 2B, the wireless section 110 is appropriately fixed onto the support section 101. The wireless section 123 is constructed to rotate about a central axis 200. In FIGS. 2A and 2B, reference numeral 201 is a metallic cabinet, reference numeral 202 is a semiconductor circuit element section constituting a high-frequency module of the wireless section, which will be described later, reference numeral 203 is a dielectric substrate, reference numeral 204 is an electrode leading airtight pin disposed on a side surface of the metallic cabinet 201, and reference numeral 205 is wiring (a wire piece of metal or the like) to connect an electrode of the semiconductor circuit element section 202 to the airtight pin 204. Reference numeral 207 is a metallic cap to keep the metallic cabinet 201 airtight. Reference numeral 208 is a stripline constituting an antenna for the millimeter band. Reference numeral 206 is wiring (a wire piece of metal or the like) to connect the stripline to the semiconductor circuit element section 202.

Reference numeral 209 is a metallic electrode and reference numeral 210 is a throughhole disposed in the metallic cabinet 201 to couple a waveguide path or line 212 of the waveguide tube 126 with the stripline 208. Reference numeral 211 is a transmission line including a metallic electrode. In the metallic electrode 211, there is disposed an opening having a contour and a size which are substantially equal to those of the waveguide path 212 of the waveguide tube 126 or an opening having a contour in a size expressed by a product between the size of the waveguide path 212 and a reciprocal number of the square root of the relative dielectric constant of the dielectric substrate 203. In FIG. 2A, there is disposed a circular opening substantially equal in size to the throughhole 210. Thanks to the configuration, it is possible that a high-frequency signal is obtained from the stripline 208 constituting an antenna and is fed to the waveguide path 212. The high-frequency signal can be supplied from the waveguide path 212 via the stripline 208 to the semiconductor circuit element section 202.

Also, the wireless section 123 is configured in almost the same way as for the wireless section 110. That is, in FIGS. 2A and 2B, reference numeral 221 is a metallic cabinet and reference numeral 222 is a semiconductor circuit element section constituting a high-frequency module of the wireless section, which will be described later. Reference numeral 223 is a dielectric substrate, reference numeral 224 is an electrode leading airtight pin disposed on a side surface of the metallic cabinet 221, and reference numeral 225 is wiring (a wire piece of metal or the like) to connect an electrode of the semiconductor circuit element section 222 to the airtight pin 224. Reference numeral 227 is a metallic cap to keep the metallic cabinet 221 airtight. Reference numeral 228 is a stripline constituting an antenna for the millimeter band. Reference numeral 226 is wiring to connect the stripline to the semiconductor circuit element section 222.

Reference numeral 229 is a metallic electrode and reference numeral 230 is a throughhole disposed in the metallic cabinet 221 to couple a waveguide path 212 of the waveguide tube 126 with the stripline 228. Reference numeral 231 is a transmission line including a metallic electrode. In the metallic electrode 231, there is disposed an opening having a contour and a size which are substantially equal to those of the waveguide path 212 of the waveguide tube 126 or an opening having a contour in a size expressed by a product between the size of the waveguide path 212 and a reciprocal number of the square root of the relative dielectric constant of the dielectric substrate 223. In FIG. 2A, there is disposed a circular opening substantially equal in size to the throughhole 230. The configuration is possible that a high-frequency signal is obtained from the stripline 228 constituting an antenna and is fed to the waveguide tube 126. The high-frequency signal can be supplied from the waveguide tube 126 via the stripline 228 to the semiconductor circuit element section 222.

Next, description will be given of the circular waveguide tube 126 and the shielding cylinder 124 to transmit the millimeter-band carrier signal. In this situation, the frequency of the millimeter band ranges, for example, from about one gigahertz (GHz) to about 60 GHz. In the description of the embodiment, there is employed, for example, a millimeter wave of 2.4 GHz. The shielding cylinder 124 having a cylindrical contour is fixed onto the metallic cabinet 221 and rotates together with the metallic cabinet 221 as one unit about the rotary axis 200. The metallic cabinet 221 and the shielding cylinder 124 are separated from the waveguide tube 126 with a gap 232 therebetween. It is therefore likely depending on cases that unnecessary electric waves leak from the gap 232 to exert adverse influence upon other electronic devices. Or, unnecessary electric waves enter the gap 232 to exert adverse influence upon the video signal. To cope with the difficulty, there is arranged the shielding cylinder 124 to prevent the leakage of the unnecessary electric waves from the gap 232 and to prevent the unnecessary electric waves from entering the gap 232. Height H of the shielding cylinder 124 and width of the gap 232 are determined as below. The wavelength λ of the 2.4 GHz millimeter wave in the tube is expressed as follows.

$$\lambda = v/f = 3.0 \times 10^{11} \text{ (mm/s)}/2.4 \times 10^9 \text{ Hz} = 125 \text{ mm} \quad (1)$$

To prevent the leakage of the electric waves from the gap 232, it is required that height H and gap width R are equal to or less than λ/4. That is, according to expression (1), height H and gap width R are set to values equal to or less than 31 millimeters (mm). Therefore, in the embodiment, height H is set to, for example, 30 mm and gap width R is set to about five millimeters also in consideration of prevention of dust. As the waveguide tube 126, there is employed a circular waveguide tube 126 having an inner diameter Ø ranging from about 30 mm to about 40 mm. The length of the waveguide tube 126 is set to nλ/4 (n is a positive integer).

The size of each section described is only an example. It is hence to be appreciated that the value of the size of each section is appropriately changed depending on the wavelength of the millimeter waves and the construction of the camera apparatus.

In the description of the configuration of the embodiment, the waveguide tube 126 is fixed onto the wireless section 110 and is separated from the wireless section 123 by the gap 232. However, since the electric wave propagates through the waveguide tube 126 in an symmetric way, it is also possible to fix the waveguide tube 126 onto the wireless section 123. In this situation, the wireless section 110 is naturally separated from the waveguide tube 126 by a gap. Therefore, the shielding cylinder 124 is fixed onto the wireless section 110. However, if the waveguide tube 126 is fixed onto the wireless section 123, since the waveguide tube 126 is driven together with the cabinet 104 as one unit, it is required to increase the driving force.

Figure 3:
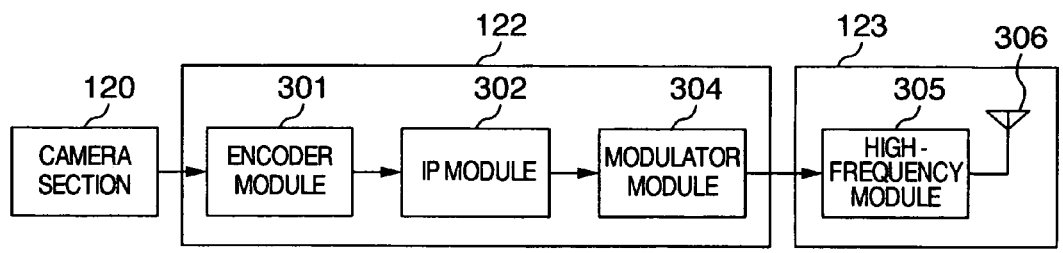
FIG. 3 is a block diagram for explaining video signal transmission of the present invention.

Next, description will be given of the signal transmission from the camera section 120 to the wireless section 123 by referring to FIG. 3. FIG. 3 shows video signal processing in a block diagram. A video signal produced in the camera section 120 by shooting an object is converted therein into video signals conforming to National Television System Committee (NTSC) or is divided into a Y signal (luminance signal) and a C signal (color signal). The resultant signals are supplied to the signal processing section 122.

The signal processing section 122 includes an encoder module 301, an Internet Protocol (IP) module 302, and a demodulator module 304. The encoder module 301 converts the video signal from the camera section 120 into a compressed signal in the Joint Photographic Experts Group (JPEG) system, the Moving Pictures Experts Group (MPEG) system, or the like to deliver the compressed signal to the IP module 302. The IP module 302 converts the video signal compressed by the encoder module 301, into a signal in the packet format suitable for the transmission and then delivers the signal to the modulator module 304. The modulator module 304 converts the signal into a signal of an intermediate frequency suitable for the wireless Local Area Network (LAN) to deliver the signal to the wireless section 123. The wireless section 123 includes a high-frequency module 305 and an antenna 306. The high-frequency module 305 includes a Radio Frequency (RF) unit and an amplifier unit and corresponds to the semiconductor circuit element section 222 shown in FIGS. 2A and 2B. The RF unit converts the signal into a carrier signal of the millimeter band as described above and delivers the carrier signal to the antenna 306. The antenna 306 corresponds to the stripline 228 shown in FIGS. 2A and 2B. Therefore, the video signal from signal processing section 122 propagates through the waveguide path 212 as the carrier signal of the millimeter band from the stripline 228 of the wireless section 123 and is then delivered to the stripline 208 of the wireless section 110.

Figure 4:
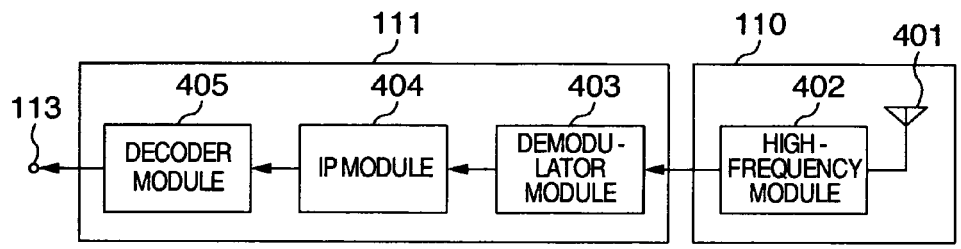
FIG. 4 is a block diagram for explaining video signal reception of the present invention.

Referring now to FIG. 4, description will be given of the wireless section 110 and the signal processing section 111. In FIG. 4, the wireless section 110 includes an antenna 401 and a high-frequency module 402 and corresponds to the stripline 208 shown in FIGS. 2A and 2B. The high-frequency module 402 includes an amplifier unit and an RF unit and corresponds to the semiconductor circuit element section 202 shown in FIGS. 2A and 2B. The carrier signal of the millimeter band received by the stripline 208 is converted by the IF module into a signal of an intermediate frequency to be fed to the signal processing section 111.

The signal processing section 111 includes a demodulator module 403, an IP module 404, and a decoder module 405. The video signal converted by the wireless section 110 into a signal of the intermediate frequency is demodulated to be converted by the demodulator module 403 into a baseband signal. The base band signal is then fed to the IP module 404. The IP module 404 converts the video signal converted by the IP module 302 described above into a signal of the packet format into the original video signal and supplies the video signal to the decoder module 405. The decoder module 405 decodes the video signal thus converted into the compressed signal of the JPEG or MPEG system as described above, to produce the original video signal and outputs the video signal from the output terminal 113.

Next, description will be given of the control signal supplied to the control signal input/output terminal 115. The control signal fed to the input/output terminal 115 is converted by the signal processing section 111 into signal suitable for the transmission and is delivered to the wireless section 110. The control signal fed to the wireless section 110 is converted into a carrier signal of the millimeter band and is supplied via the waveguide tube 126 to the wireless section 123. The wireless section 123 converts the carrier signal into an IF signal and supplies the IF signal to the signal processing section 122. The signal processing section 122 converts the IF signal into a baseband signal and separates each control signal to thereby adjust the zooming unit of the optical system of the camera section and the pan and tilt directions. On the other hand, information items of the results of the control operations associated by the respective control signals, for example, the zooming magnification factor of the optical system and the setting values of the pan and tilt angles are outputted via the signal processing section 122, the wireless section 123, the waveguide tube 126, the wireless section 110, and the signal processing section 111 from the input/output terminal 115 to be displayed on the monitor or the like.

Figure 6:
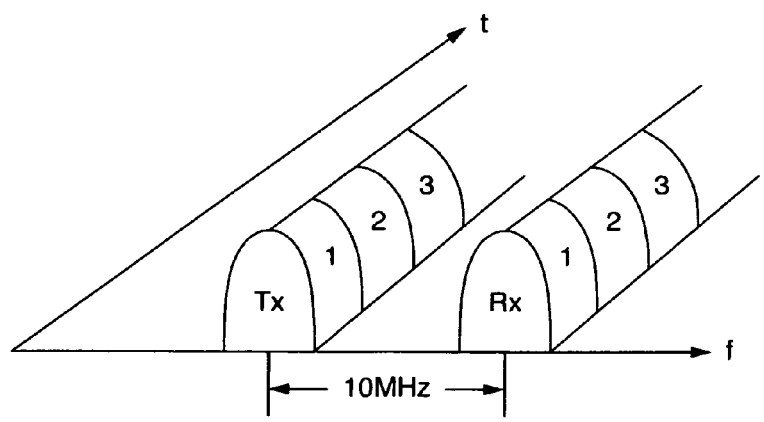
FIG. 6 is a diagram for explaining transmission and reception waves of a carrier signal in the millimeter band used according to the present invention.
Figure 5:
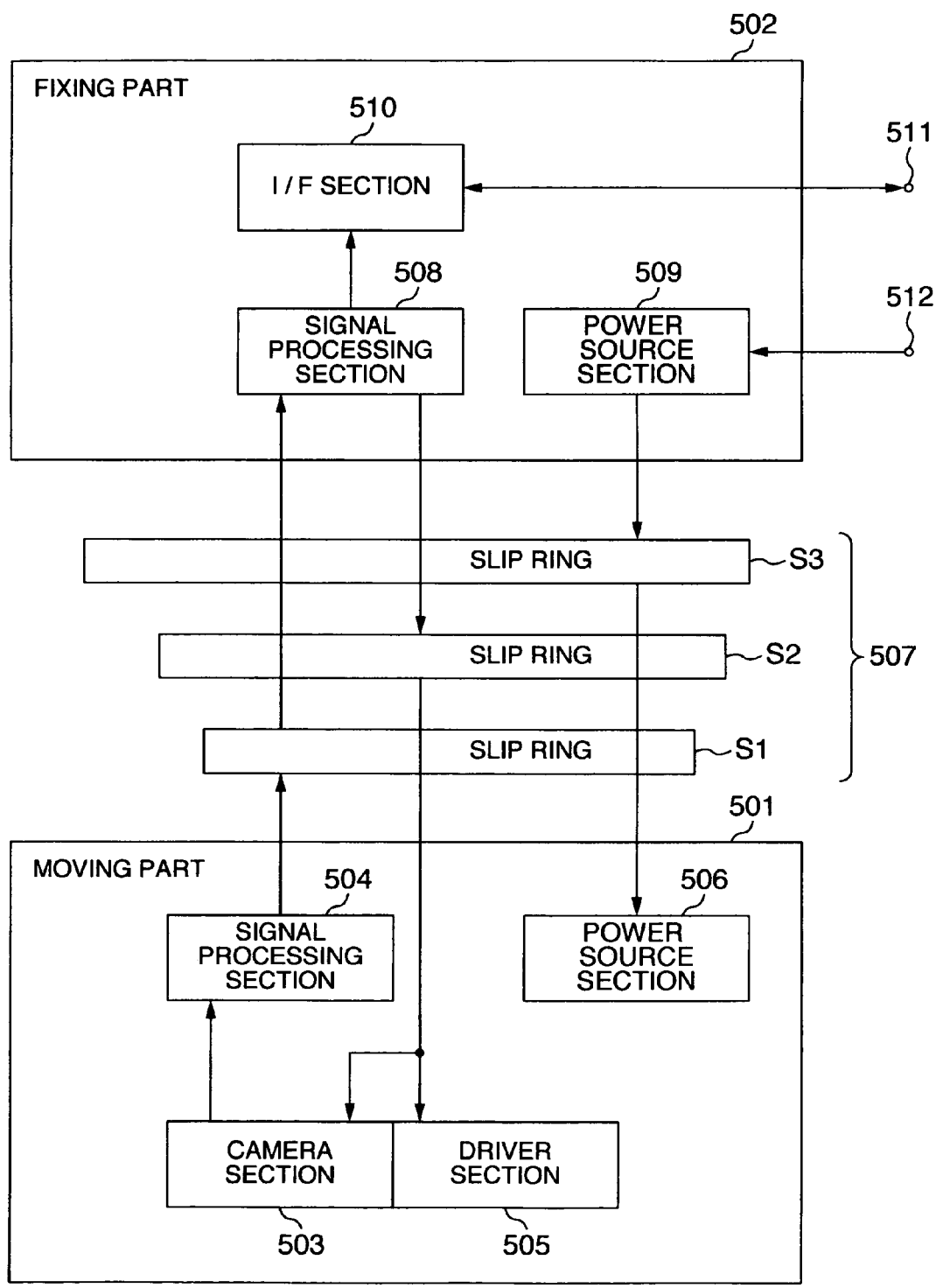
FIG. 5 is a diagram showing an outline of the configuration of an example of the conventional camera apparatus.

Referring now to FIG. 6, description will be given of the mode of transmitting the video and control signals. FIG. 6 shows transmission and reception signal waves of the carrier signal of the millimeter band in which the f axis represents the frequency and the t axis represents time. According to the present invention, a frequency of the 2.4 GHz band is employed as the carrier frequency. For example, a carrier frequency of Tx is employed in the forward direction (the direction from the wireless section 123 to the wireless section 110) and a carrier frequency of Rx is employed in the reverse direction (the direction from the wireless section 110 to the wireless section 123). The forward carrier frequency Tx is about ten megahertz apart from the reverse carrier frequency Rx. Each of the carrier frequencies Tx and Rx includes a plurality of time-division channels, i.e., channels 1, 2, 3, and so on to transmit mutually different signals. For example, in the forward direction, the video signal produced by the camera section 120 is converted by the signal processing section 122 into a signal of a format required for the transmission and is then transmitted by the wireless section 123 using, for example, channel 1 of the carrier frequencies Tx. The information items of the zooming magnification factor of the camera section and the pan and tilt directions are converted by the signal processing section 122 into signals of a format required for the transmission and are then transmitted by the wireless section 123 using, for example, channel 2 of the carrier frequencies Tx. Therefore, the wireless section 110 having received the carrier frequencies Tx converts the received signal into an IF signal and supplies the IF signal to the signal processing section 111. The signal processing section 111 converts the video signal transmitted through channel 1 into the original video signal and outputs the video signal from the output/input terminal 113. The information items regarding control transmitted through channel 2 are converted into the original signals and are outputted from the output terminal 115.

On the other hand, the control signal from the control signal input/output terminal 115 is amplitude-modulated, frequency-modulated or multivalue-modulated by the signal processing section 111 to be converted into a signal of a format required for the transmission. The signal is then transmitted by the wireless section 110 using, for example, channel 1 of the carrier frequencies Rx. The wireless section 123 converts the received signal into an IF signal to supply the IF signal to the signal processing section 122. the signal processing section 122 demodulates the received signal of channel 1 to obtain the original control signal to thereby conduct the necessary control operations for the zooming magnification factor of the camera section and the pan and tilt directions.

According to the present invention described above, although the power is supplied using the slip ring, large-capacity data such as the video data or the control data is transmitted via the waveguide tube using the carrier wave of the millimeter band. Moreover, the camera apparatus of the present invention can conduct the endless rotation. Therefore, it is possible to implement a camera apparatus capable of transmitting high-resolution and high-quality image data and the like.

Description has been given in detail of the present invention. However, the present invention is not restricted by the embodiment of the camera device described above. It is to be appreciated that the present invention is applicable to camera apparatuses other than the camera apparatus described above.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A camera apparatus, comprising:
a fixing part;
a moving part rotating about a rotary axis; and
a waveguide tube for propagating an electric wave and coupling the first wireless section with the second wireless section,
wherein the fixing part comprising at least:
a first wireless section,
a first signal processing section; and
a power source section, and
the moving part comprising at least:
a camera section;
a second signal processing section;
a second wireless section; and
a driver section for driving the camera section, and
wherein the waveguide tube comprising a waveguide path aligned with a center of the rotary axis of the moving part.

2. The camera apparatus according to claim 1, wherein:
either one of the first and second wireless sections is fixed onto a first end of the waveguide tube; and
other one of the first and second wireless sections is supported with a predetermined gap between the other one wireless section and a second end of the waveguide tube.

3. The camera apparatus according to claim 2, further comprising a shielding cylinder for preventing leakage of the electric wave, wherein:
the shielding cylinder comprises an axis thereof aligned with an axis of the waveguide path and covers the gap.

4. The camera apparatus according to claim 3, wherein the shielding cylinder has a length set to at most about a quarter of a wavelength $\lambda$ of the electric wave in the waveguide tube, the electric wave propagating through an inside of the waveguide tube.

5. The camera apparatus according to claim 1, wherein:
the fixing part further comprises a power source section, the camera apparatus further comprising a slip ring on the waveguide tube;
power from the power section is fed via the slip ring to at least to the camera section, the second signal processing section, the second wireless section, the second wireless section, and the driver section for driving the camera section of the moving part; and
a video signal from the camera section disposed in the moving part is obtained via the second wireless section and the waveguide tube from the first wireless section.

* * * * *